United States Patent [19]

Shinmura et al.

[11] Patent Number: 4,588,912
[45] Date of Patent: May 13, 1986

[54] D.C. BRUSHLESS MOTOR WITH AN IMPROVED YOKE

[75] Inventors: Tetsuro Shinmura; Tutomu Kinoshita, both of Kariya, Japan

[73] Assignee: Nippondenso Co., Ltd., Kariya, Japan

[21] Appl. No.: 658,651

[22] Filed: Oct. 9, 1984

[30] Foreign Application Priority Data

Oct. 24, 1983 [JP] Japan .................. 58-199832
Aug. 24, 1984 [JP] Japan .................. 59-177295

[51] Int. Cl.⁴ .......................... H02K 11/00
[52] U.S. Cl. .......................... 310/68 R; 310/43; 310/71; 310/89
[58] Field of Search ............ 310/68 R, 89, 68 B, 310/254, 40 MM, 91, 88, 71, 46, 156, 43, 90; 318/138, 254 R

[56] References Cited

U.S. PATENT DOCUMENTS

| | | | |
|---|---|---|---|
| 3,180,267 | 4/1965 | Bemmann | 310/43 |
| 3,845,339 | 10/1974 | Merkle | 310/68 R |
| 4,115,713 | 9/1978 | da Costa | 310/40 MM |
| 4,181,867 | 1/1980 | Muller | 310/68 R |
| 4,242,608 | 12/1980 | Ishigaki | 310/68 B |
| 4,429,240 | 1/1984 | Kishi | 310/68 R |

FOREIGN PATENT DOCUMENTS

| | | | |
|---|---|---|---|
| 55-4991 | 1/1980 | Japan . | |
| 58-46283 | 3/1983 | Japan . | |
| 5837/68 | 12/1970 | Switzerland | 310/156 |

*Primary Examiner*—R. Skudy
*Attorney, Agent, or Firm*—Cushman, Darby & Cushman

[57] ABSTRACT

In a D.C. brushless motor, a drive coil (11), a drive circuit (40), and an magnetoelectric transducer (19) are mounted on an insulating base plate (7) which is received in a generally cup-shaped yoke (12). The drive coil, drive circuit and transducer are all mounted on a first side of the base plate (7) while terminals (7b) of the drive circuit protrude from the first side. As a result, the base plate (7) is placed on a bottom of the yoke (12) which bottom substantially faces an entire area of a rotor (5) of the motor thereby reluctance of a magnetic circuit formed by said yoke (12) is substantially constant during one revolution of the rotor (5). The base plate may (7) be directly in contact with the yoke (12) so as to facilitate heat dissipation, while the drive circuit (40) and the transducer (19) are hermetically sealed by a synthetic resin (7d). In some embodiments, a recess (12c) is formed in addition to a center recess (12g) of the yoke (12) so that the rotor (5) is accurately positioned at a desired initial setting position on deenergization of the drive coil (11) and quick start of the rotor (5) is accomplished.

8 Claims, 19 Drawing Figures

D.C. BRUSHLESS MOTOR WITH AN IMPROVED YOKE

BACKGROUND OF THE INVENTION

This invention relates generally to D.C. brushless motors, and more particularly, to the structure of such a motor in which a drive circuit is installed.

D.C. brushless motors are widely used in various fields because of high durability and reliability. For instance, D.C. brushless motors are often used as small electric fans or blowers installed in motor vehicles. In such conventional D.C. brushless motors, a printed circuit board carrying drive coils, a position sensor and other circuit elements are mounted on a stator. Japanese Utility Model Provisional Publication No. 58-46283 discloses such a motor where a yoke used as a magnetic path is necessarily positioned at a back side of a disc-like printed circuit board, which back side is opposite to a front side facing a rotor of the motor. Furthermore, since pins or legs of various circuit elements attached to the printed circuit board protrude beyond the surface of the back side of the the circuit board, the yoke has to be provided at a small portion of the printed circuit board while a drive coil is mounted on the front surface because the pins or legs of the circuit elements are obstacles to the attachment of the yoke. As a result, an area of the yoke facing the rotor corresponds to a relatively small area of the rotor, and therefore reluctance of a magnetic circuit formed by the rotor and the stator, including the yoke, changes during one revolution of the rotor. Accordingly, the attractive force between magnets of the rotor and the yoke changes during one revolution to cause the occurrence of undesirable vibrations or cogging. Therefore, the advantage of coreless structure of such a D.C. brushless motor has hitherto been reduced to a large extent.

Moreover, since the circuit elements are exposed according to the structure disclosed in the above-mentioned prior art publication, it is necessary to provide a partition or to apply a sealing agent to the electrical conducting portions of the circuit elements so as to prevent the drive circuit from becoming dusty. This is disclosed in another Japanese Utility Model Provisional Publication No. 55-4991.

SUMMARY OF THE INVENTION

The present invention has been developed in order to remove the above-described drawbacks inherent to conventional D.C. brushless motors.

It is, therefore, an object of the present invention to provide a new and useful D.C. brushless motor having at the stator side of the motor a yoke whose area substantially corresponds to an entire area of the rotor so that reluctance of the magnetic circuit is substantially constant during a single revolution of the rotor.

According to a feature of the present invention, a D.C. brushless motor with superior dust-proof and moisture proof characteristics is provided because the parts of the drive circuit are hermetically sealed.

According to another feature of the present invention, heat generated in the drive circuit is readily dissipated through the yoke of the motor since a substrate of the drive circuit is in contact with the yoke.

According to a further feature of the present invention, the yoke of the motor, which yoke is generally cup-shaped, has a recess on the side wall or a bottom of the yoke so that the rotor is accurately positioned at a desired initial setting position when being deenergized.

According to a still further feature of the present invention, the rotor is capable of readily starting on energization because of the presence of the above-mentioned recess.

In accordance with the present invention there is provided D.C. brushless motor, comprising: a rotor having a plurality of magnets; and a stator having a generally cup-shaped yoke, a drive coil, a drive circuit, a magnetoelectric transducer, terminals, and an insulating base plate attached to the yoke, the base plate having a aperture and walls surrounding the aperture for defining a circuit housing at a first side of the base plate, the drive circuit being formed on a substrate on which the magnetoelectric transducer is also placed, the substrate carrying the drive circuit and the magnetoelectric transducer on one surface thereof being received in the aperture of the base plate so that opposite side of the substrate is flush with a second side of the base plate, the circuit housing being filled with a synthetic resin so as to hermetically sealing the drive circuit and the magnetoelectric transducer, the drive coil being placed on the first side of the base plate, the terminals being connected to the drive circuit at one ends thereof while the other ends thereof protrude from the first side of the base plate, the base plate being positioned on a substantially flat bottom of a center recess of the yoke such that the first side faces the magnets of the rotor with the second side of the base plate being substantially in contact with the bottom of the center recess of the yoke, the substantially flat bottom of the center recess of the yoke substantially facing an entire surface of the rotor.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated by like reference numerals throughout the drawings.

DETAILED DESCRIPTION OF THE INVENTION

Figure 1A:
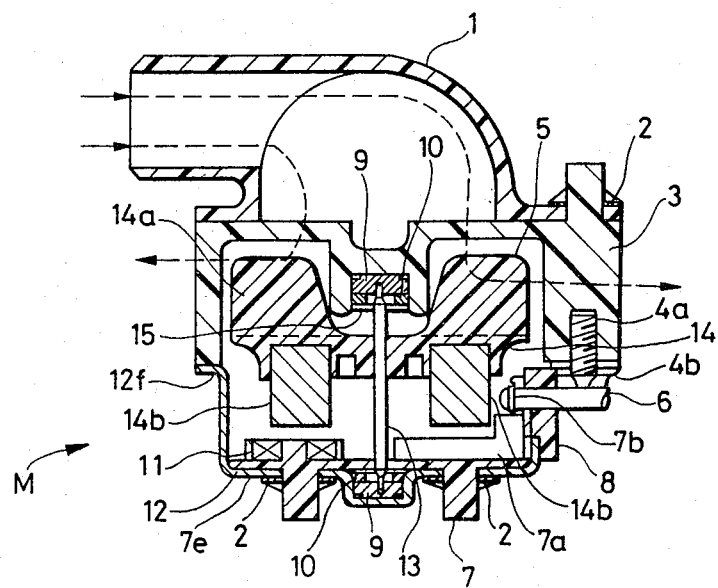
FIGS. 1A to 1E show a first embodiment of the motor according to the present invention.

Referring now to FIGS. 1A to 1E of the drawings, a blower using a small electrical motor according to one embodiment of the present invention is shown. FIG. 1A is a schematic cross-sectional view of the blower, the intended airflow being shown by way of dotted lines.

The blower of FIG. 1A comprises an upper housing 1 with an air inlet, and a lower housing 3 made of a synthetic resin. The upper and lower housings 1 and 3 are coupled with each other to form a blower housing by way of toothed lock washers 2 as shown. Air outlets (not shown) are made in a side wall of the lower housing 3, and a rotor 5 of an electrical motor M according to the present invention is partially received in the lower housing 3.

Figure 1B:
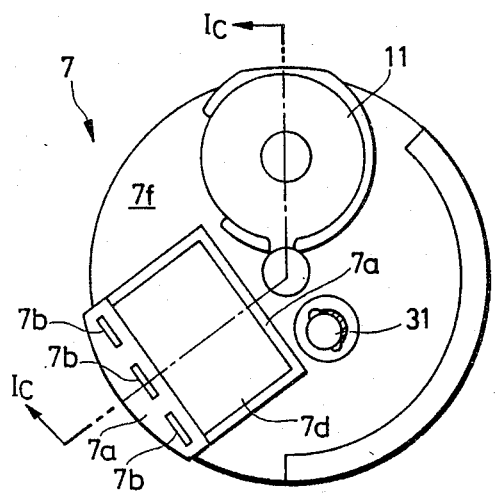
Figure 1C:
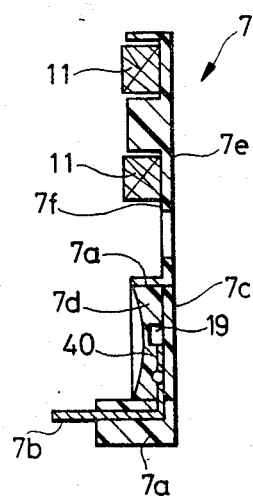

The reference 4a is a bolt for coupling a motor M to the lower housing 3, the reference 4b being a washer used for the bolt 4a. The reference 6 indicates a plurality of lead wires which are respectively connected to terminals 7b which are seen in FIG. 1B showing a top plan view of a stator portion of the motor M. The reference 12 identifies a generally cup-shaped metallic yoke formed of a magnetic material. This yoke 12 constitutes a part of a magnetic circuit of the motor and also functions as a motor housing. The yoke 12 is attached to the lower end of the lower housing 3 at its flange 12f to define a recess into which various parts of the motor M, including the rotor 5 and a stator, are received. The reference 7 is a base plate made of a synthetic resin, and a drive circuit 40 of the motor M is mounted on the base plate 7 as seen in FIG. 1C which is a cross-section taken along a dot-dash line $I_C$–$I_C$ in Fig. 1B. As will be described hereinafter, the drive circuit 40 includes a Hall IC 19 (an integrated circuit with a Hall generator), and other parts which are all embedded in a molded synthetic resin 7d (FIG. 1C). The base plate 7 has walls rising normally with respect to the bottom surface 7e of the base plate 7 so as to define recess functioning as a circuit casing or housing 7a within which the drive circuit 40 is received. More specifically, the circuit housing 7a is filled with a molten synthetic resin 7d which is then hardened to heremetically seal the drive circuit 40. Since walls are provided to define the circuit housing 7a, the molten synthetic resin applied to the circuit housing 7a is prevented from flowing therefrom and spreading. The circuit housing 7a is formed on the surface of the base plate 7 which surface faces the rotor 5, as shown in FIG. 1A. Three terminals 7b (FIG. 1B) made of L-shaped metallic strips are partially embedded in one wall of the circuit casing 7a. The reference 8 (FIG. 1A identifies a grommet made of rubber, the reference 9 being an M. The bearings 9 are provided with annular felt sheets 10 used for preventing oil of the bearings 9 from escaping.

A drive coil 11 is placed on the surface 7f of the base plate 7 facing the rotor 5, and is connected to the drive circuit 40 as will be described in detail hereinafter. A permanent magnet 31 used for initial positional setting of the rotor C5 is arranged with respect to the yoke 12 that the magnet 31 penetrates an aperture the base plate 7 as seen in FIG. 1B.

Figure 1D:
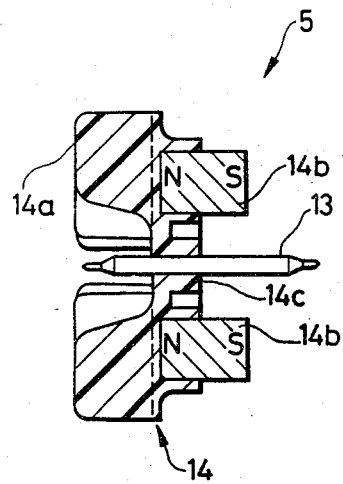
Figure 1E:
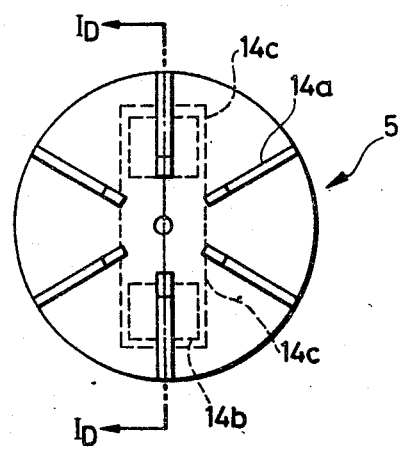

The rotor 5 comprises a rotor body 14 made of a synthetic resin and a plurality of permanent magnets 14b. In the embodiment, of FIG. 1A two magnets 14b are respectively received in recesses made in the rotor body 14. The rotor body 14 has a fan 14a formed on the other side thereof from the recesses which receive the magnets 14b. The reference 15 identifies a toothed lock washer used for retaining the upper felt sheet 10 in place. A top plan view of the rotor 5 is seen in FIG. 1E, while a cross-sectional view of the rotor 5 taken along a dot-dash line $I_D$–$I_D$ in FIG. 1E is seen in FIG. 1D. As seen in FIG. 1E, the recesses receiving the magnets 14b are radially aligned such that the recesses are defined within a rectangular boss 14c forming a portion of body 14.

Figure 5A:
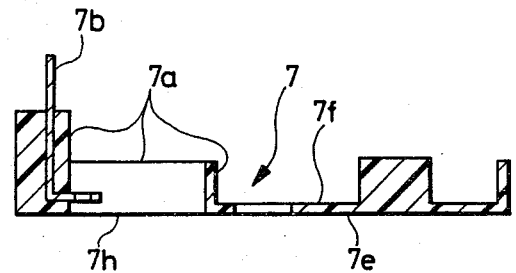
FIGS. 5A to 5D show a manufacturing process of the base plate and the drive circuit received therein.
Figure 5B:
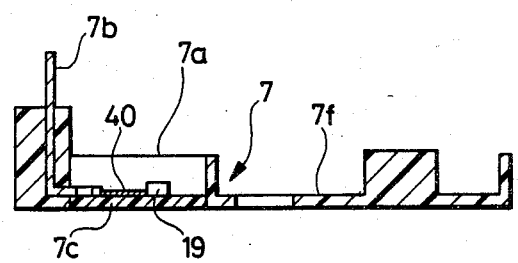
Figure 5C:
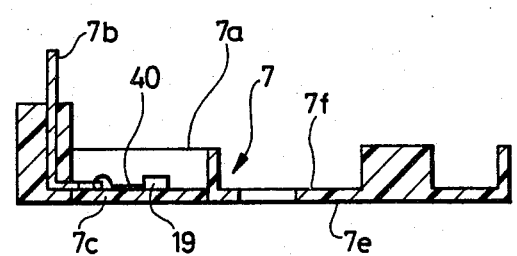
Figure 5D:
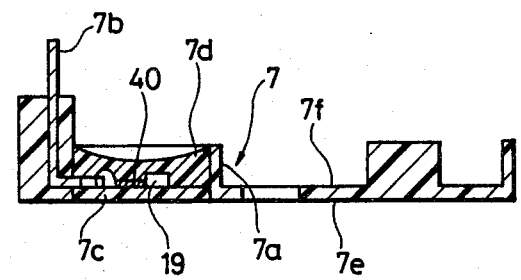

The drive circuit 40, which is formed as a hybrid IC, is attached to the base plate 7 through a process shown in FIGS. 5A to 5D. First of all, the base plate 7 is integrally formed in such a manner that the L-shaped terminal strips 7b are partially embedded as seen in FIG. 5A. At a portion of the base plate 7 corresponding to the above-mentioned circuit casing 7a an aperture is formed. Then the drive circuit 40 having the Hall IC 19 is placed in the circuit casing 7a so that a substrate portion 7c of the drive circuit 40 is substantially flush with the base plate 7 as seen in FIG. 5B. The terminals 7b are respectively connected to three terminals (not shown) of the drive circuit by way of soldering as shown in FIG. 5C. Finally, the circuit casing 7a is filled with a synthetic resin 7d so that various parts or elements of the drive circuit 40 are embedded therein to be hermetically insulated from the atmosphere. After the drive coil 11 (FIG. 1C) is arranged on the base plate 7 the plate carrying thereon the coil 11 and circuit 40 -- is placed on the bottom of the generally cup-shaped yoke 12 as seen in FIG. 1A.

Figure 2:
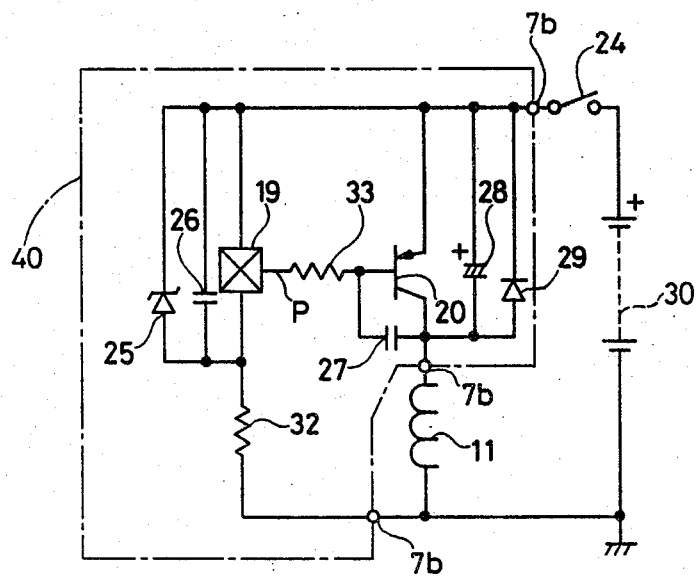
FIG. 2 is a circuit diagram of an electrical circuit used in the first embodiment.

An example of a circuit arrangement used for the drive circuit 40 is shown in FIG. 2 (the circuit per se being known in the art). A switch 24 for connecting the drive circuit 40 to a power source 30 is provided, it will be understood that the switch 24 and the power source 30, as well as the drive 11, are not included in the drive circuit 40 received in the circuit casing 7a. To make clear this point, elements or parts received in the circuit casing 7a are enclosed by a dot-dash line. All the parts of the drive circuit 40 except for the Hall IC 19 are made as a single IC. The reference 20 indentifies a switching transistor of pnp type whose collector is connected to one terminal of the drive coil 11. The Hall IC 19 used as a semiconductor magnetoelectric transducer has an output terminal P connected to base of the switching transistor 20 via a current-limiting resistor 33. A capacitor 26 and a zener diode 25 connected in parallel to the Hall IC 19 are used to absorb surge voltages.

A capacitor 27 connected between base and emitter of the transistor 20 suppresses sudden changes in the output voltage from the transistor 20, which voltage is applied to the drive coil 11. More specifically, the waveform of the output voltage from the transistor 20 is made dull so as to reduce noise on rotation of the motor M. Another capacitor 28 connected between collector and emitter of the transistor 20 is provided to absorb noise voltages and to prevent oscillation of the drive circuit 40. A diode 29 connected across the capacitor 28 is used to protect the transistor 20 from a reverse voltage.

As the Hall IC 19, a monolithic integrated circuit using Hall effect, and a Hall IC (switch type) known as DN 6839 and manufactured by Matsushita Electronics Corporation, may be used therefor. This Hall IC DN 6839 comprises an output transistor of the open-collector type. When one of the magnets 14 of the rotor 5 shown in FIG. 1A approaches the Hall IC 19 (FIG. 1C) retained within casing 7a, the output transistor of open-collector type becomes conductive to lower the output voltage at the output terminal P of the Hall IC 19 to nearly zero volt. As a result, the transistor 20 of the drive circuit 40 of FIG. 2 is turned on to assume a saturated state so that a saturated ouput current is applied to the drive coil 11. In this way each time the transistor 20 becomes conductive, the drive coil 11 is energized.

Figure 3:
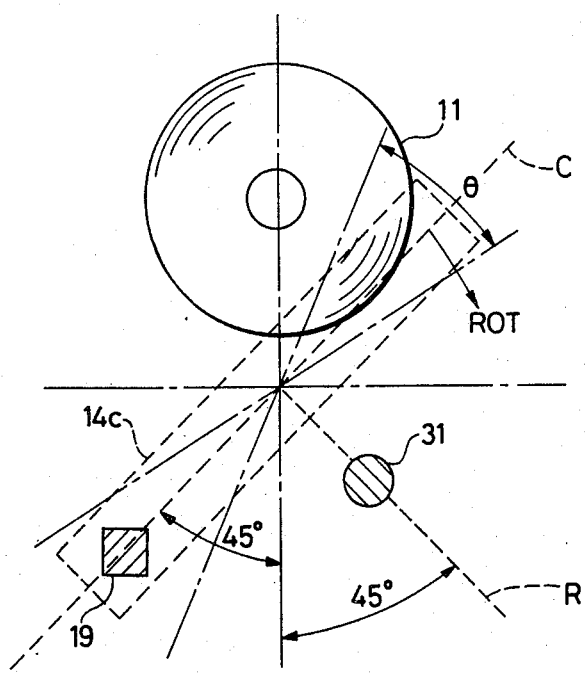
FIG. 3 is an explanatory diagram showing a stopping operation of the rotor of the motor according to the present invention.

The D.C. brushless motor M according to the above-described embodiment operates as follows. When the switch 24 is in open state, the rotor 5 is forcibly situated at a predetermined angular position at which one of the magnets 14b is close to the Hall IC 19 causing the Hall IC 19 to produce a low output voltage when the switch 24 subsequently is turned on. One of methods for controlling the initial position of the rotor 5 is disclosed in Japanese utility Model Provisional Publication 55-4991. In this embodiment, when the switch 24 is turned off, the rotor speed decreases and the rotor 5 assumes a predetermined angular position so that the two magnets 14b are equidistantly spaced apart from the permanent magnet 31 provided on the yoke 12, as shown in an explantory diagram of FIG. 3. More specifically, the rectangular boss 14c (detailed in FIGS. 1D and 1E having recesses in which the magnets 14b are received), assumes a position such that its longitudinal center line C is normal to a radial line R passing through an axis of rotation corresponding to the shaft 13 (shown in FIG. 1A) and through the center of the permanent magnet 31 due to repulsive forces between the magnets 14b and the stationary magnet 31 inasmuch as the facing poles of the magnets 14b and the magnet 31 are South poles. In this way, whenever the rotor 5 stops rotating, the rotor 5 is situated as shown in FIG. 3.

Assuming that the switch 24 is now turned on, since the output voltage from the Hall IC 19 is of low level (nearly zero volt), the transistor 20 is rendered saturated so that a maximum saturation current is initially fed to the drive coil 11. Accordingly, a maximum repulsive force or an attractive force is produced between the magnets 14b and the drive coil 11, causing the rotor 5 to start rotating in a clockwise direction as indicated by an arrow ROT (FIG. 3). Immediately after the center line C of the boss 14C has passed through a given angular range $\theta$ for energization centering the position of the Hall IC 19, then the output transistor of open-collector type of the Hall IC 19 is turned off to produce a high level signal. On receipt of such a high level signal, the switching transistor 20 is turned off to terminate energization of the drive coil 11. However, the rotor continues rotating due to its inertia.

As the rotor 5 rotates 180° so that the boss 14c of the rotor 5 enters again the energization angular range $\theta$, the transistor 20 again is turned on to energize the drive coil 11. In this way, a maximum repulsion or attractive force is successively applied to the rotor 5 so that the rotor 5 keeps rotating as long as the switch 24 is in an on state condition.

Figure 4:
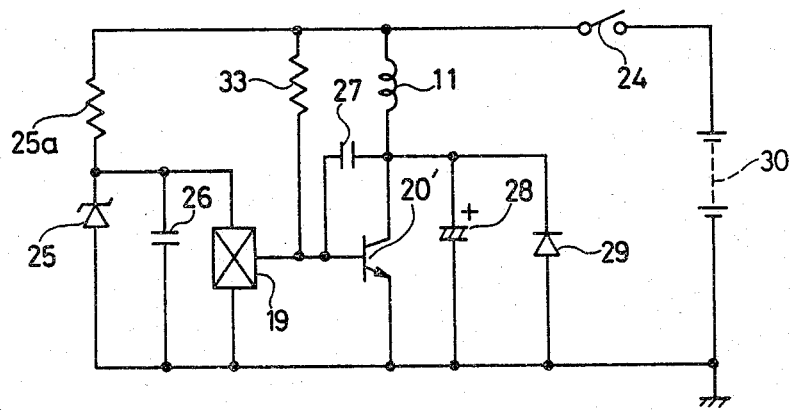
FIG. 4 is a circuit diagram of a drive circuit which is a modification of the circuit of FIG. 2.

Reference is now made to FIG. 4 showing a modification of the drive circuit. The drive circuit of FIG. 4 differs from the drive circuit 40 of FIG. 2 in that a transistor 20' of npn type is used in place of the transistor 20 of pnp type. Thus, the circuit configuation is changed accordingly. While elements corresponding to those in FIG. 2 are designated by like numerals, the reference 25a is a resistor. The drive circuit of FIG. 4 operates in a similar manner to the drive circuit 40 of FIG. 2.

As will be understood from the above description, either a repulsive force or attractive force may be used as a rotational drive force of the rotor 5, while the arrangement of the magnets 14b, drive coil 11 and so on in the motor M is kept unchanged for both cases.

If the polarity of the magnets 14b or winding direction of the drive coil 11 is reversed, then the rotating direction of the rotor 5 also is reversed. When it is desired to rotate the rotor 5 in both clockwise and counterclockwise directions, a switch may be provided for changing the direction of current applied to the drive coil 11.

Although it has been described that a Hall IC is used as a semiconductor magnetoelectric transducer in the above embodiment, other elements may be used in place of such a Hall IC for the same purpose. For instance, a magnetoresistor or a magnetic diode may be used for converting the change in resistance into a change in voltage. Furthermore, a directional magnetoelectric transducer may be used to utilize its output voltage. Any of these transducer elements may be used as a small device having the structure of an integrated circuit.

In this way, according to the the present invention, parts and elements of the drive circuit 40 are formed in an integrated circuit such that the housing of the integrated circuit, i.e. the circuit casing 7a, substrate 7c and the filled resin 7d, is substantially integral with the base plate 7 which forms a main part of the stator, where the housing is made of insulating synsthetic resin.

With this arrangement, several advantages are attained.

(1) Since the yoke 12 faces the rotor 5 throughout almost an entire one surface of the rotor 5, the variation in reluctance during one revolution of the rotor 5 is reduced. As a result, undesirable vibrations and noise caused from such variation are reduced.

(2) Since the parts and elements of the drive circuit 40 are not exposed because they are sealed within a housing of a synthetic resin after being formed in an integrated circuit, its resistance to environmental changes is superior.

(3) The yoke 12, which forms a part of a magnetic circuit, functions as a magnetic shielding which interrupts magnetic interference from atmosphere. Therefore, when the motor M according to the present invention is mounted on a motor vehicle, the D.C brushless motor according to the present invention is not affected by outer ferromagnetic substances, such as steel plates. As a result, the rotor 5 can be accurately positioned at a desired initial setting position as shown in FIG. 3, and therefore, missstarting due to an undesired initial setting position of the boss 14C of the rotor 5 can be avoided.

Furthermore, since the housing 7a, 7c and 7d of the drive circuit 40 is substantially integral with the base plate 7 such that the bottom surface of the substrate 7c is flush with the bottom surface 7e of the base plate 7, the distance between the bottom surface of the substrate 7c and the metallic yoke 12, which functions as a heat sink, can be reduced to an extent that they directly contact each other so that heat dissipation is effectively performed.

Moreover, since the yoke 12 also functions as a motor housing, the number of parts forming the motor M is reduced.

Figure 6A:
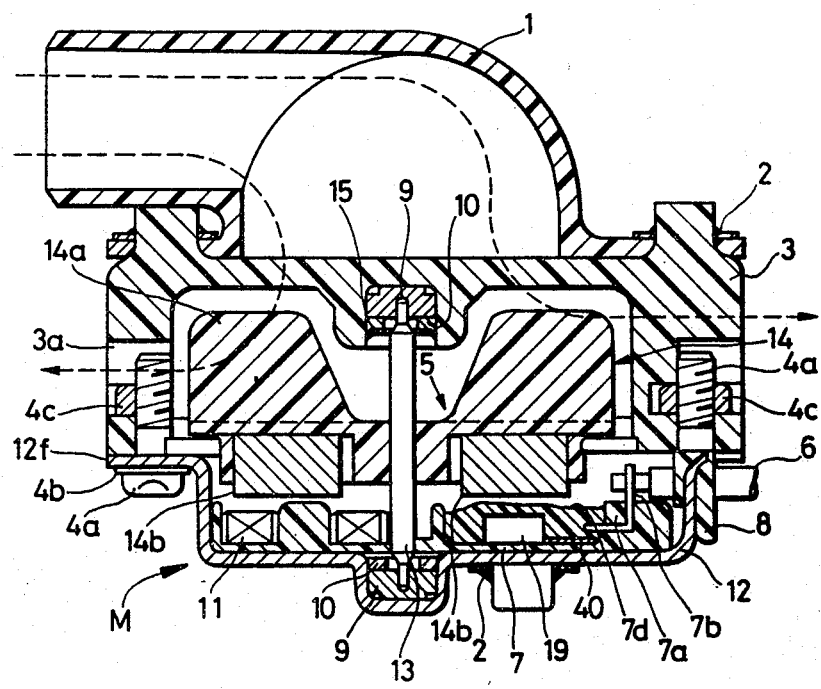
FIGS. 6A to 6C show a second embodment of the motor according to the present invention.
Figure 6B:
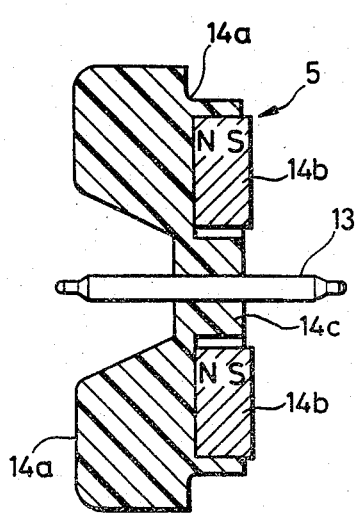
Figure 6C:
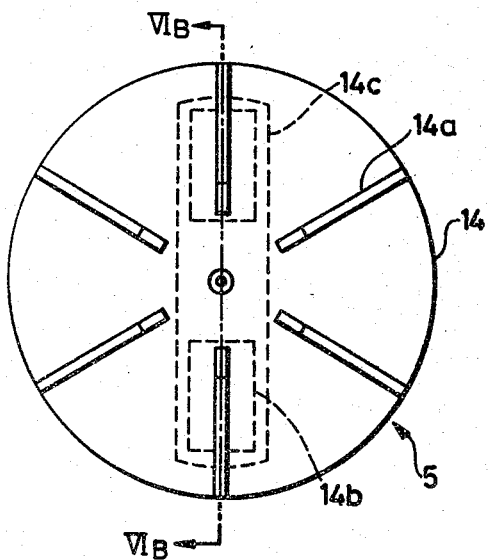

A second embodiment of the present invention will be described with reference to FIGS. 6A, 6B, 6C, 7A and 7B. FIGS. 6A, 6B and 6C respectively show the second embodiment motor M substantially in the same manner as in FIGS. 1A, 1D and 1E. This embodiment differs from the previous embodiment in that the yoke 12 has a recessed portion 12c (FIG. 3A) in addition to a circular center recess 12g forming a generally cup-shaped yoke 12 as will be seen from FIG. 6A and FIG. 7A, the latter illustrating a top plan view of the yoke 12. The additional recess 12c is provided to cause the rotor 5 to stop at a desired initial setting position as will be described in detail hereinafter, and this additional recess is also useful in providing an enough room or space for receiving the terminals 7b and lead wires 6 connected thereto as seen in FIG. 7B, which is a partial view of the stator including the yoke 12 and the base plate 7.

The bottom of the recess 12c, which will be referred to as an additional recess hereinafter, is preferably flush with the bottom of the circular center recess 12g. Although the yoke 12 used in the first embodiment is generally cup-shaped so that a center portion thereof is deep to provide a generally circular surface facing the magnets 14b of the rotor 5, the center recess 12g of the second embodiment extends radially to provide the additional recess 12c. Within this additional recess 12c is received the terminals 7b of the drive circuit 40. The provision of the additional recess 12c causes the rotor 5 to stop at the initial setting position accurately on deenergization as will be described in detail hereinafter. In addition, the further recess 12 enhances the starting characteristic of the motor M. Remaining structure of the second embodiment may be the same as the first embodiment.

The second embodiment operates as follows. When the drive coil 11 is deenergized to stop the motor M, then the rotational speed of the rotor 5 decreases and finally the rotor 5 would stop at the initial setting position, which is indicated by the boss 14c shown by way of dotted lines in FIG. 7A, because of the magnetic force acting between the magnets 14b and the stationary magnet 31 fixed at the bottom of the center recess 12g of the yoke 12. However, the rotor 5 does not necessarily stop at the initial setting position shown in FIG. 7A because the magnetic force from the stationary magnet 31 is not great. Although it is possible to use a large magnet as the stationary magnet 31 so that the rotor 5 stops accurately at the desired intial setting position, the increase in intensity of the magnetic force from the magnet 31 would result in undesirable braking force to the rotor 5 when the rotor 5 rotates.

Figure 7A:
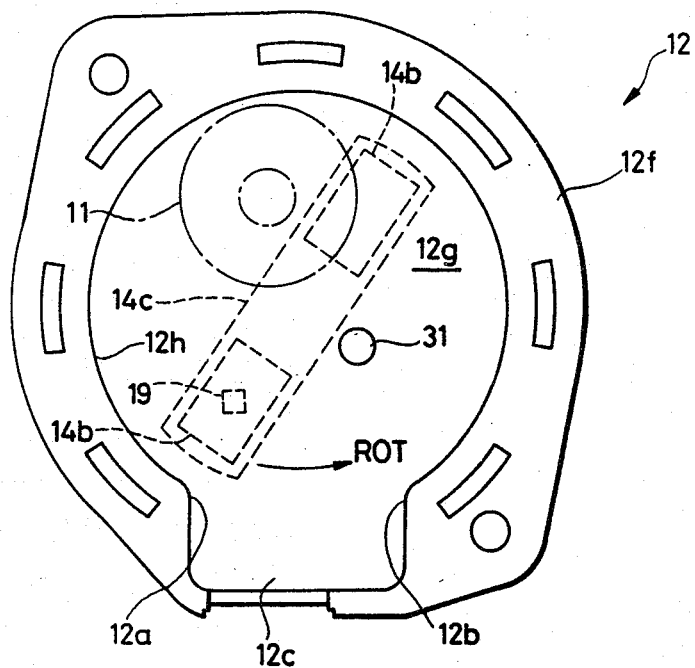
FIGS. 7A and 7B show the shape of the yoke used in the second embodiment motor.
Figure 7B:
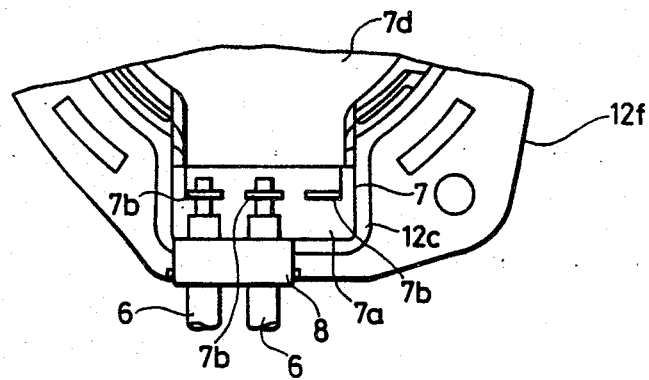

In the second embodiment, the distance between the magnet 14b in FIG. 7A and the side wall 12h connecting the flange 12f to the bottom of the center recess 12g suddenly changes at edge portions 12a and 12b of the additional recess 12c. More specifically, the additional recess 12c located on the side wall 12h which defines the center recess 12g subtends a given angle with respect to the center of recess 12g so that the side wall 12h is spaced apart from the rotor 5 by the larger distance at the additional recess 12c than a distance between the rotor 5 and the side wall along remaining portion of the wall. Therefore, the attractive magnetic force between the magnet 14b and the side wall 12h becomes lower when the magnet 14b faces the additional recess 12c. Since magnetic flux is apt to be concentrated on an edge or sharp portion of a magnetic material, the attractive force between the magnet 14b and the side wall 12h is highest when the magnet 14b faces the edge 12a or 12b. Positioning of the rotor 5 on deenergization of the drive coil 11 is accurately performed by such an attractive magnetic force, or detent torque, between the magnet 14b and the left edge 12a. By "detent torque" is meant the magnetic force acting between the magnets 14b of the rotor 5 and the yoke 12 of the stator. If the center recess 12g had a perfect circular shape, the magnitude of such a detent torque would be constant throughout the circumference of the center recess 12g because the distance between the magnet 14 and an annular side wall of the yoke 12 is always constant. However, because of the provision of the additional recess 12c, the degree of a detent torque is high when the boss 14c is positioned as shown in FIG. 7A. The existance of the detent torque or attractive force between the illustrated lower magnet 14b and the edge portion 12a has been confirmed by experiments. It will be understood that although such a detent torque also occurs between the magnet 14b and the right edge 12b, the rotor 5 stops at the illustrated position due to the magnetic force from the stationary magnet 31. The left edge 12a of the additional recess 12c is positioned so that one of the magnets 14b of the rotor 5 is close to the left edge 12a when the rotor 5 is situated at the illustrated and desired initial setting position.

The provision of the additional recess 12c not only provides the above-mentioned accurate positioning of the rotor 5 on deenergization of the drive coil 11 but also quick starting of the rotor 5 on energization of the drive coil 11. When the drive coil 11 is energized to cause the rotor 5 to start rotating in the direction indicated by an FIG. 7A, the rotor 5 rotates over a slight angle due to an attractive or repulsive force between the magnets 14b and the drive coil 11. At this time the attractive force between the illustrated lower magnet 14b and the right edge 12b increases to accelerate the rotor 5. Therefore, the rotor 5 immediately starts rotating.

Figure 8A:
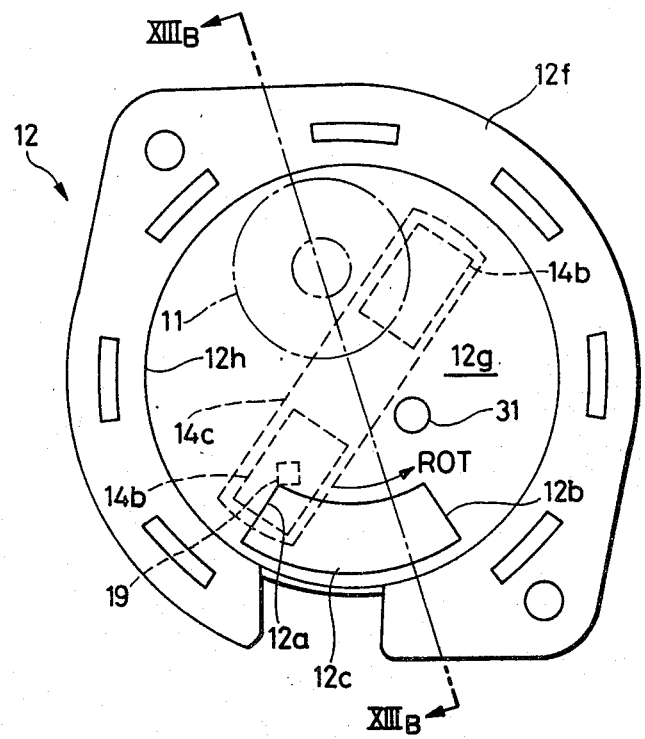
FIGS. 8A and 8B show the shape of the yoke used in a third embodiment of the motor.
Figure 8B:
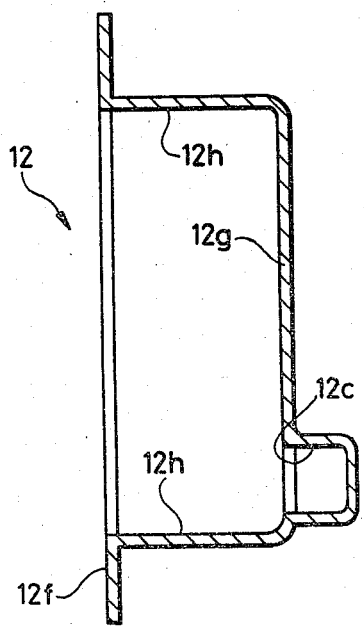

FIGS. 8A and 8B show a third embodiment which is a modification of the above-described second embodiment. In this embodiment, an additional recess 12 is formed at the bottom of the center recess 12g of the yoke 12. The additional recess 12c is of truncated sector shape, and is positioned so as to subtend a given angle with respect to the center of the center recess 12g in a manner similar to the second embodiment. More specifically, the additional recess 12c is positioned so that a locus of a portion of the magnets 14b is just above the additional recess 12c. As clearly seen in FIG. 8B which is a cross-section taken along a line $XIII_B—XIII_B$ of FIG. 8A, the additional recess 12c is deeper than the center recess 12g. As a result, the distance between the magnets 14b of the rotor 5 and the yoke 5, which distance is measured along a direction parallel to the shaft 13 of the rotor 5, becomes large when the magnet 14b is above the additional recess 12c. Accordingly, a detent torque similar to that in the second embodiment occurs between the magnet 14b, which is positioned at the lower side in FIG. 8A, and edges 12a and 12b. Thus the rotor 5 is accurately positioned at an initial setting position shown by way of dotted lines in FIG. 8A because of the detent torque between the lower magnet 14b and the left edge 12a of the additional recess 12c and because of the magnetic force from the stationary magnet 31. The right edge 12b faciltates acceleration of the rotor 5 in the same manner as in the second embodiment because an attractive force between the lower magnet 14b and the right edge 12b increases as the magnet 14b approaches thereto immediately after a slight rotation of the rotor 5 in a direction of the arrow ROT.

The above-described embodiments are just examples of the present invention, and therefore, it will be apparent for those skilled in the art that many modifications and variations may be made without departing from the scope of the present invention.

What is claimed is:

1. A D.C. brushless motor, comprising:
   (a) a rotor having a plurality of magnets; and (b) a stator having a generally cup-shaped metallic yoke, a drive coil, a drive circuit, a magnetoelectric transducer, terminals, and an insulating base plate attached to said yoke, said base plate having a recess and wall surrounding said recess for defining a circuit housing at a first side, both said base plate and said walls being made of a synthetic resin being integral with each other, said drive circuit being formed on a substrate on which said magnetoelectric transducer is also placed, said substrate carrying said drive circuit and said magnetoelectric transducer on a front surface thereof being received in said recess of said base plate side of said substrate is flush with a second side of said, said circuit housing being filled with a synthetic resing so as to hermetically seal said drive circuit and said magnetoelectric transducer, said drive coil being placed on said first side of said base plate at a place other than said circuit housing, at least one of said walls radially protruding from the periphery of said base plate, said terminals being embedded in said at least one wall and being connected to said drive circuit at one ends thereof and the other ends thereof being protruding from said first side of said base plate, said terminals extending in a direction normal to a plane of said base plate toward said rotor, said base plate being positioned on a substantially flat bottom of a center recess of said yoke such that said first side faces said magnets of said rotor with a second side of said base plate being substantially in close contact with said bottom of said center recess of said yoke, said substantially flat bottom of said center recess of said yoke substantially facing an entire one side surface of said rotor.

2. A D.C. brushless motor as claimed in claim 1, wherein said circuit housing is integral with said base plate, which is made of a synthetic resin.

3. A D.C. brushless motor as claimed in claim 1, wherein a back side of said substrate is in contact with said flat bottom of said center recess of said yoke so that heat generated in said drive circuit is readily transmitted to said yoke.

4. A D.C. brushless motor as claimed in claim 1, wherein said yoke has a bearing for receiving one end of a shaft of said rotor.

5. A D.C. brushless motor as claimed in claim 1, wherein said cup-shaped yoke comprises a peripheral wall portion partially surrounding said rotor so as to serve as a motor housing.

6. A D.C. brushless motor as claimed in claim 1, further comprising a stationary magnet for initial position setting of said rotor.

7. A D.C. brushless motor as claimed in claim 6, wherein said yoke has an additional recess on a side wall forming said center recess, said additional recess subtending a given angle with respect to a center of said center recess so that said side wall is spaced apart from said rotor by a larger distance at said additional recess than a distance between said rotor and said side wall at a remaining portion, one edge of said additional recess being positioned so that one of said magnets of said rotor is close to said edge when said rotor is situated at starting initial starting position.

8. A D.C. brushless motor as claimed in claim 6, wherein said yoke has an additional recess on a bottom of said center recess, said additional recess subtending a given angle with respect to a center of said center recess so that said bottom is spaced apart from said rotor by a larger distance at said additional recess than a distance between said rotor and said bottom at a remaining portion, one edge of said additional recess being positioned so that one of said magnets of said rotor is close to said edge when said rotor is situated at an initial starting position.

* * * * *